US008977795B1

(12) United States Patent
Mater et al.

(10) Patent No.: US 8,977,795 B1
(45) Date of Patent: Mar. 10, 2015

(54) METHOD AND APPARATUS FOR PREVENTING MULTIPLE THREADS OF A PROCESSOR FROM ACCESSING, IN PARALLEL, PREDETERMINED SECTIONS OF SOURCE CODE

(71) Applicant: Marvell International Ltd., Hamilton (BM)

(72) Inventors: Olaf Mater, Eggenstein-Leopoldshafen (DE); Sascha Schmeckenbecher, Karlsruhe (DE)

(73) Assignee: Marvell International Ltd. (BM)

( * ) Notice: Subject to any disclaimer, the term of this patent is extended or adjusted under 35 U.S.C. 154(b) by 219 days.

(21) Appl. No.: 13/658,177

(22) Filed: Oct. 23, 2012

Related U.S. Application Data

(60) Provisional application No. 61/552,424, filed on Oct. 27, 2011.

(51) Int. Cl.
*G06F 9/52* (2006.01)

(52) U.S. Cl.
CPC . *G06F 9/52* (2013.01); *G06F 9/526* (2013.01)
USPC ............ 710/240; 710/200; 710/244; 718/106

(58) Field of Classification Search
CPC ................................. G06F 9/52; G06F 9/526
USPC ........... 710/200, 240, 244; 718/103, 104, 106
See application file for complete search history.

(56) References Cited

U.S. PATENT DOCUMENTS

| 7,380,038 | B2 * | 5/2008 | Gray ............................. 710/243 |
| 2005/0240924 | A1 * | 10/2005 | Jones et al. ................... 718/100 |
| 2009/0288074 | A1 * | 11/2009 | Carroll et al. ................. 717/158 |
| 2012/0060160 | A1 * | 3/2012 | Krauss .......................... 718/102 |

* cited by examiner

Primary Examiner — Glenn A Auve

(57) ABSTRACT

Systems, methods, and other embodiments associated with managing access to critical sections in a multithread processor are described. According to one embodiment, an apparatus includes a register configured to store i) respective resource identifiers that identify respective resources and ii) respective priorities for respective resource identifiers. The apparatus includes a managing module logic configured to receive a blocking instruction for a first resource having a first resource identifier that is associated with a first task, access the register to determine a priority associated with the first resource identifier, select one or more dependent resources based, at least in part on the priority associated with first resource identifier, and block the first resource and the dependent resources. In this manner the first task is granted access to the first resource and the dependent resources while other tasks are prevented from accessing the first resource and the dependent resources.

20 Claims, 5 Drawing Sheets

METHOD AND APPARATUS FOR PREVENTING MULTIPLE THREADS OF A PROCESSOR FROM ACCESSING, IN PARALLEL, PREDETERMINED SECTIONS OF SOURCE CODE

CROSS REFERENCE TO RELATED APPLICATIONS

This disclosure claims the benefit of U.S. Provisional Application No. 61/552,424 filed on Oct. 27, 2011, which is incorporated herein by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Most of today's processors have multiple cores and utilize software that supports multithreading. In multithreading, multiple threads, or tasks, are occurring simultaneously. Multithread-enabled operating systems provide various blocking mechanisms that block parallel execution of "critical sections". A critical section is a sequence of source code that accesses a resource that is shared among multiple threads but that should be accessed by a single thread at a time. When a set of operations from a single thread that needs to be executed together in a certain order access a critical section, concurrent access to the critical section by other threads that would upset consistency is blocked. For example, a task that performs data transfer to a device typically includes several operations that rely on exclusive access to a critical section to maintain consistency. While the task is executing the source code in the critical section, other tasks are blocked from access to the critical section.

SUMMARY

In general, in one aspect this specification discloses an apparatus for managing access to critical sections in a multithread processor. The apparatus includes a register configured to store i) respective resource identifiers that identify respective resources and ii) respective priorities for respective resource identifiers. The apparatus also includes a managing module logic configured to receive a blocking instruction for a first resource having a first resource identifier, wherein the blocking instruction is associated with a first task, access the register to determine a priority associated with the first resource identifier, select one or more dependent resources based, at least in part on the priority associated with first resource identifier, and block the first resource and the dependent resources. In this manner the first task is granted access to the first resource and the dependent resources while other tasks are prevented from accessing the first resource and the dependent resources.

In general, in another aspect, this specification discloses a method for managing access to critical sections in a multithread processor. The method includes receiving a blocking instruction for a first resource, wherein the blocking instruction is associated with a first task; determining a priority associated with the first resource. The method includes selecting one or more dependent resources based, at least in part on the priority associated with first resource. The method includes blocking the first resource and the dependent resources such that the first task is granted access to the first resource and the dependent resources while other tasks are prevented from accessing the first resource and the dependent resources.

In general, in another aspect, this specification discloses a device for managing access to critical sections in a multithread processor. The device includes a processor configured to simultaneously process multiple threads. The device also includes a software configured to execute the multiple threads by accessing one or more resources that are shared among the multiple threads. Access to each of the one or more shared resources is controlled by a critical section, such that a shared resource cannot be accessed by a thread when the critical section that controls access to the shared resource is blocked. The device includes a managing module logic configured to receive a blocking instruction from a first thread for a first critical section; determine a priority associated with a first critical section, select one or more dependent critical sections having the same or lower priority with respect to the first critical section. The managing module logic is configured to identify one or more higher priority critical sections having a higher priority than the first critical section, determine if any higher priority critical sections are blocked, and if no higher priority critical sections are blocked, block access by other threads to the first critical section and the dependent critical sections.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Critical sections in a program typically operate independently from each other. For example, transfers to and from a device may be run in parallel by controlling access to a single critical section without impact on other critical sections. However, some operations (e.g., reset or reconfiguration) may require blocking of several or all of the independent critical sections. For example, a network driver uses several queues to handle transmit packets and receive packets. Each queue is protected from simultaneous access by its own critical section, but several queues can be accessed in parallel. A reset request from the software requires exclusive access to all queues to complete operation. Exclusive access means that the reset request task will wait while a critical section is blocked by another task (e.g., a queue is processing data packets). Exclusive access also ensures that no other task will enter the critical section while the reset request task is waiting. Once all other tasks have left the critical sections (e.g., all data in the queues has been processed), the reset request task blocks access to the critical sections for the queues.

Tasks which require exclusive access to multiple shared resources are often referred to as higher priority tasks. Higher priority tasks are difficult for a programmer to code because he must remember all the critical sections that need to be blocked and include blocking instructions for all of the critical sections in the higher priority task. If another programmer adds a new critical section, she must also be aware of all higher priority tasks and change the code of the higher priority tasks to include a blocking instruction for the new critical section.

Described herein are examples of systems, methods, and other embodiments associated with managed task blocking. A managing module provides an application programming interface for recording blocking mechanisms for resources (e.g., critical sections). A priority for each blocking mechanism is also recorded in the register. When a blocking instruction for a given resource is received by the managing module, the priority of the resource is determined from the register. Access to resources having the same or lower priority is blocked by the managing module. In this manner, blocking mechanisms for any number of resources can be centrally registered and managed, simplifying programming significantly.

Figure 1:
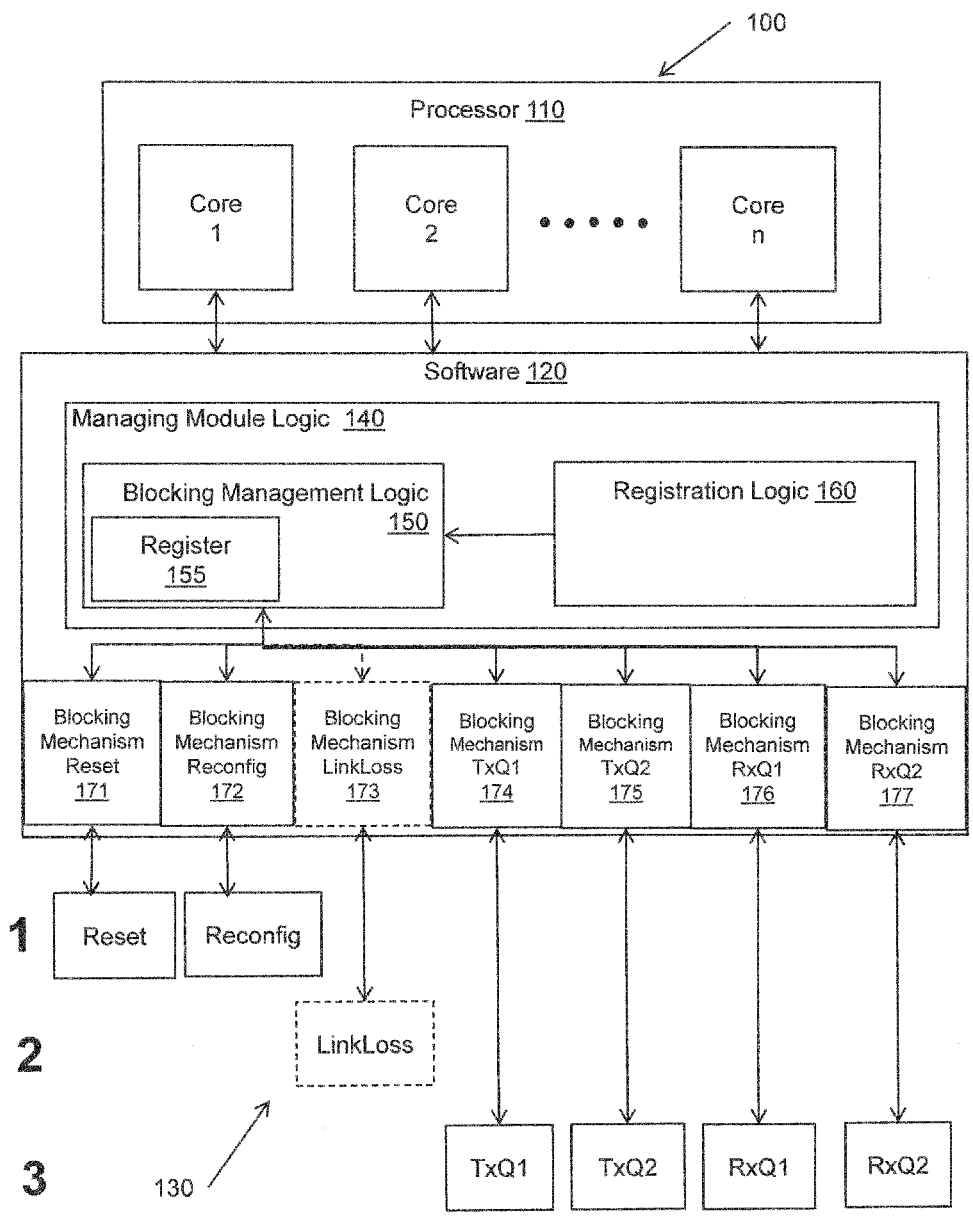
FIG. 1 illustrates one embodiment of an apparatus associated with managing access to critical sections in a multithread processor.

FIG. 1 illustrates one embodiment of an apparatus 100 that is associated with managed task blocking. The apparatus includes a multi-core processor 110, a software 120, and a plurality of resources 130. The software 120 handles multiple simultaneously executing threads, or tasks, that utilize the multi-core processor 110 and the resources 130. The resources 130 are shared among all the tasks, so the software 120 controls access to the tasks in a manner that maintains consistency with respect to operations within individual tasks and as between the tasks. The resources 130 may be hardware (e.g., queues TxQ1, TxQ2, RxQ1, RxQ2) or software (e.g., reset request subroutine, reconfiguration subroutine, link loss subroutine). Access to each resource is controlled by a blocking mechanism 171-177. In one embodiment, the blocking mechanism for a resource is a critical section that controls access to the resource, as will be described in more detail with respect to FIGS. 3 and 5. Other blocking mechanisms, such as locks, mutexes, semaphores, and so on, may also be used to control access to shared resources.

Figure 2:
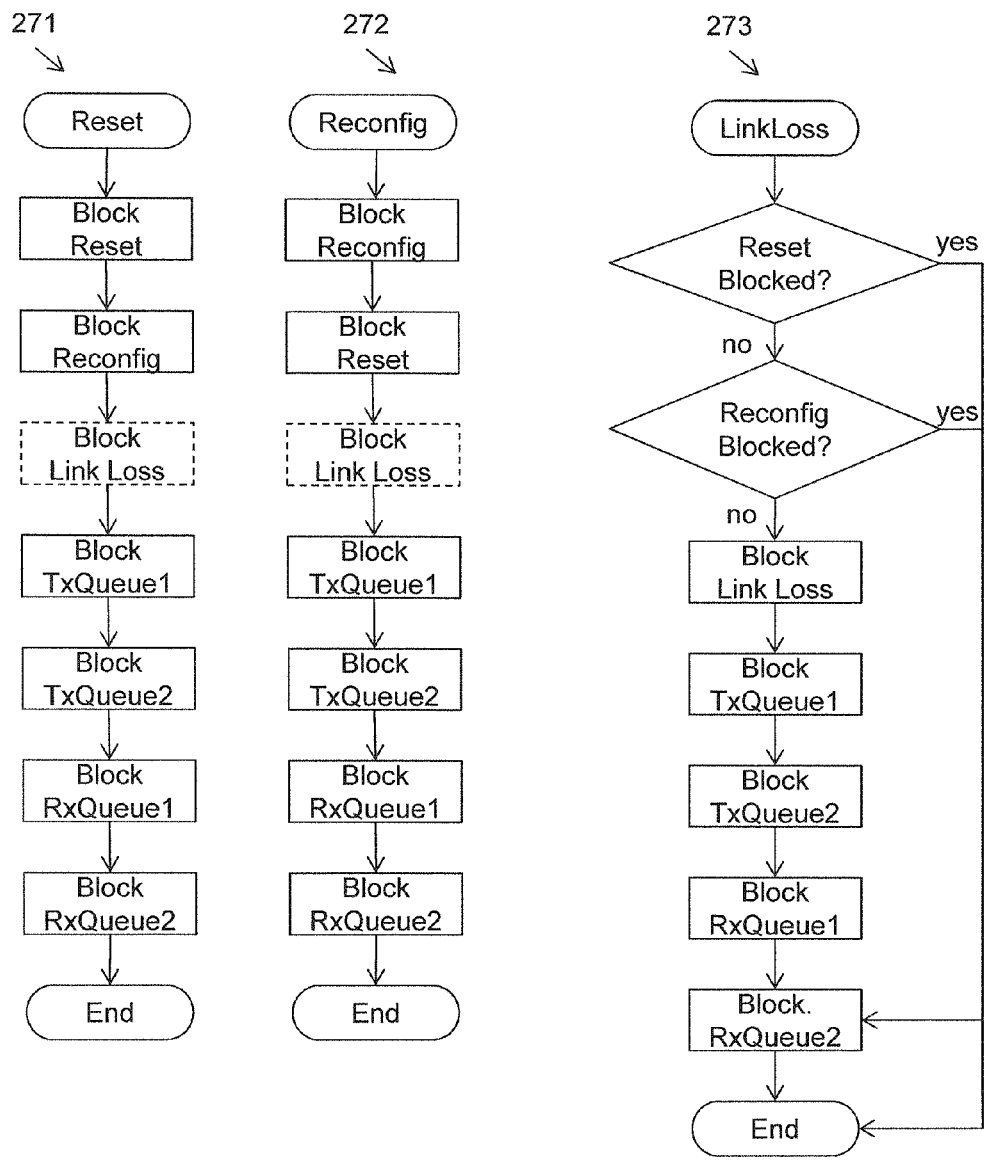
FIG. 2 illustrates one embodiment of independent critical sections not managed according the embodiments described herein.

FIG. 2 illustrates a blocking mechanism for a reset request resource 271 and a blocking mechanism for a reconfiguration request resource 272 as part of a software. FIG. 2 reflects a prior art scenario in which the various blocking mechanisms are handled independent of one another, rather than being centrally managed. Thus, the blocking mechanism for the reset request 271 includes blocking access to the reset request (to prevent interruption by a parallel reset request), the reconfiguration request, a first transmit queue, a second transmit queue, a first receive queue, and a second receive queue. Note that a programmer coding the reset request blocking mechanism 271 must be aware of the reconfiguration request and all of the queues so that the blocking mechanism 271 functions properly.

In FIG. 2, a new resource, a link loss subroutine that checks the link status of a network connection, is added to the application. The link loss subroutine needs to block access to all transmit and receive queues. The link loss subroutine has a lower priority than the reset and reconfiguration request resources, meaning that if either the reset or reconfiguration request is currently executing, the link loss subroutine should allow these requests to complete before blocking access to the queues.

A blocking mechanism for the link loss subroutine 273 is shown in FIG. 2. Since the link loss subroutine has a lower priority than the reset request and the reconfiguration request, the blocking mechanism 273 checks the blocking mechanisms for these higher priority resources first. If no higher priority resources are blocked, the blocking mechanism 273 includes block instructions to block access to the link loss subroutine, the first transmit queue, the second transmit queue, the first receive queue, and the second receive queue. If either the reset request or the reconfiguration request is blocked, the blocking mechanism 273 does not block any resources. Usually if any higher priority resource is blocked, the link loss blocking mechanism 273 will wait until no higher priority resource is blocked and then will block access to the queues.

In addition to creating the blocking mechanism for the link loss subroutine 273, a programmer creating the blocking mechanism must also insert a block instruction for the link loss subroutine in all other blocking mechanisms as shown in dashed line in the blocking mechanisms 271, 272. This illustrates the complexity that is encountered in programming when blocking mechanisms are independent of one another. A programmer has to be aware of all other blocking mechanisms to be included in a blocking mechanism for a new resource. The programmer also has to locate and modify all the other blocking mechanisms.

Returning now to FIG. 1, the software includes a managing module logic 140 that centrally manages the blocking mechanisms 171-177. The managing module logic 140 is configured to process blocking instructions for shared resources according to a priority that has been assigned to the shared resources. The managing module logic 140 is configured to receive a blocking instruction for a given resource associated with a given task. The managing module logic 140 determines a priority associated with the given resource. Based on the priority, the managing module logic 140 selects other resources as dependent resources. When processing the blocking instruction for the given resource, the managing module logic 140 blocks access to the given resource and also to the dependent resources. In this manner, the given task is granted access to the given resource and the dependent resources while other tasks are prevented from accessing the first resource and the dependent resources.

To facilitate management of the blocking mechanisms, the managing module logic 140 stores resource identifiers that identify resources and priorities for the resource identifiers in a register 155. The managing module logic 140 accesses the register 155 to determine the priorities associated with the given resource and the other resources.

In one embodiment, the managing module logic 140 includes a blocking management logic 150 and a registration logic 160. The blocking management logic 150 manages the blocking mechanisms based on priorities assigned to the shared resources' blocking mechanisms. Continuing with the example, the link loss subroutine is assigned a priority of 2 (e.g., in a scale where priority 1 stands for the highest and 3 for the lowest priority). The reset and reconfiguration request subroutines have a priority of 1 and the queues have a priority of 3. These priorities are recorded in the register 155. When the managing module logic 140 receives a blocking instruction from the link loss subroutine, the blocking management logic 150 consults the register 155 and determines that the link loss subroutine has a priority of 2. The blocking management logic 150 identifies resources with a same or lower priority (e.g., a priority of 2 or 3) as dependent resources. Thus, the blocking management logic 150 identifies the transmit and receive queues as dependent resources and blocks access to the transmit and receive queues when it blocks access to the link loss subroutine.

The blocking management logic 150 identifies resources with a higher priority (e.g., a priority of 1). The blocking management logic 150 checks a blocking status of the higher priority resources (e.g., reset and reconfiguration) prior to processing the blocking instruction for the link loss subroutine. If a higher priority resource is blocked, the blocking instruction for the link loss subroutine is not processed.

The registration logic 160 provides an interface through which the register may be populated with resource identifiers and associated priorities. The registration logic 160 receives the registration requests of each dependent critical section used in the software 120. This may be done during initialization of the software 120. The registration logic 160 receives resource identifiers and corresponding priorities. The registration logic 160 stores the resource identifiers and corresponding priorities in the register 155.

Figure 3:
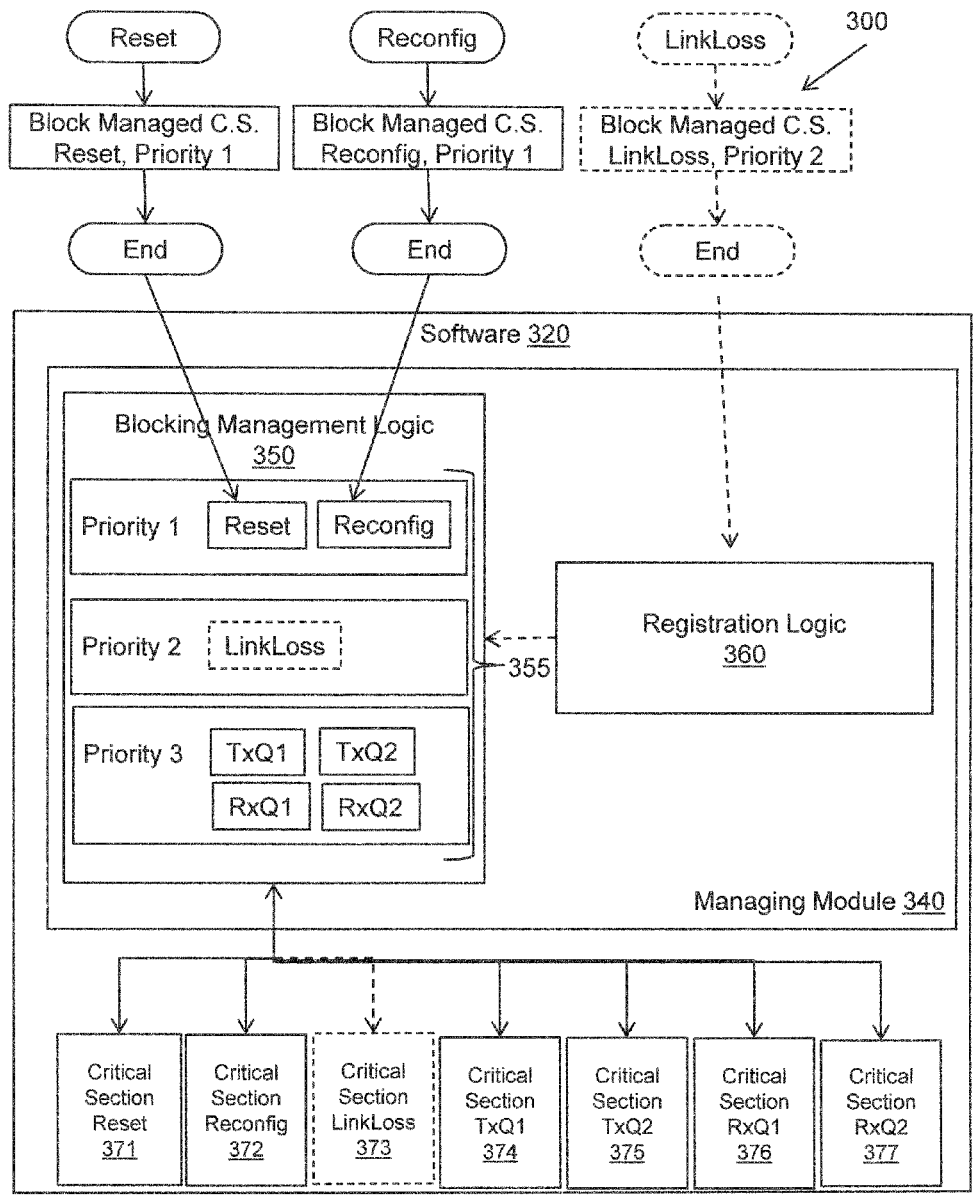
FIG. 3 illustrates one embodiment of an apparatus associated with managing access to critical sections in a multithread processor.

FIG. 3 illustrates one embodiment of an apparatus 300 that provides managed task blocking. In the apparatus 300, blocking mechanisms are critical sections 371-377 that each control access to a shared resource (not shown). A software 320 includes a managing module logic 340 that centrally controls blocking of critical sections. The managing module logic 340 includes a blocking management logic 350 that blocks critical sections based on a priority associated with various critical sections. The blocking management logic 350 accesses a register 355 that stores resource identifiers that correspond to critical sections (e.g., Reset, Reconfig, TxQ1, TxQ2, RxQ1, RxQ2). The register 355 categorizes the critical sections by priority (e.g., priorities 1-3).

The managing module logic 340 also includes a registration logic 360 through which dependent critical sections are registered during initialization of the software 320 and stored in register 355. The register 355 has been populated for the reset and reconfiguration critical sections having priority 1 as shown in FIG. 3. To implement a new blocking mechanism, the registration logic 360 is used to store a new resource identifier that identifies a critical section (e.g., LinkLoss in the continuing example) and a priority for the critical section (e.g., priority 2 for LinkLoss). The simplicity of this coding effort is to be compared with the coding illustrated in FIG. 2. The programmer no longer has to be aware of all the other critical sections. The programmer simply adds code to register the new critical section and assigns a priority to the new critical section.

During task execution, the blocking management logic 350 receives a blocking instruction for a first resource (e.g., the link loss subroutine) associated with a first task. The blocking management logic 350 accesses the register 355 to determine a priority associated with a first critical section (e.g., Critical Section LinkLoss 373) identified by the first resource identifier (e.g., LinkLoss). The blocking management logic 350 selects one or more dependent resources (e.g., TxQ1, TxQ2, RxQ1, RxQ2) based, at least in part on the priority associated with first resource identifier. The blocking management logic 350 blocks the first resource and the dependent resources by blocking access to the critical sections that control access to the first resource (e.g., Critical Section LinkLoss 373) and the dependent resources (e.g., Critical Section TxQ1 374, Critical Section TxQ2 375, Critical Section RxQ1 376, Critical Section RxQ2 377).

Prior to blocking the first resource and the dependent resources, the blocking management logic 350 accesses the register 355 and identifies higher priority resources (e.g., reset request and reconfiguration request which both have priority 1). The blocking management logic 350 checks whether any higher priority resources are blocked. If any higher priority resource is blocked, the blocking instruction is not immediately processed. In one embodiment, processing of the blocking instruction is delayed until the higher priority resource is no longer blocked.

Figure 4:
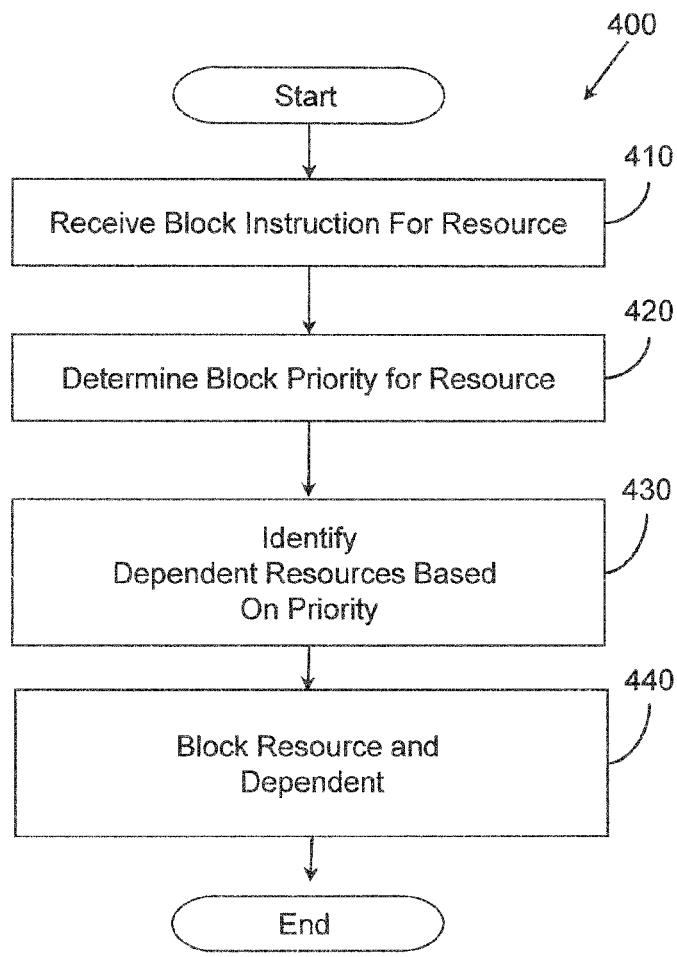
FIG. 4 illustrates one embodiment of a method associated with managing access to critical sections in a multithread processor.

FIG. 4 illustrates one embodiment of a method 400 associated with managed task blocking. The method 400 includes, at 410, receiving a blocking instruction for a first resource, where the blocking instruction is associated with a first task. The method includes, at 420, determining a priority associated with the first resource. The method includes, at 430, selecting one or more dependent resources based, at least in part on the priority associated with first resource. The method includes, at 440, blocking the first resource and the dependent resources such that the first task is granted access to the first resource and the dependent resources while other tasks are prevented from accessing the first resource and the dependent resources.

In one embodiment, the method includes selecting resources having the same or lower priority with respect to the first resource as the dependent resources. The method also includes identifying higher priority resources with higher priority than the first resource and blocking the first resource and the dependent resources in a manner determined, at least in part, on a blocking status of the higher priority resources. If no higher priority resource is blocked, the first resource and the dependent resources are blocked. If any higher priority resource is blocked, the blocking of the first resource and the dependent resources is delayed until no higher priority resource is blocked.

In one embodiment, the method includes determining the priority of the first resource and other resources by accessing a register that stores i) respective resource identifiers that identify respective resources and ii) respective priorities for respective resource identifiers. In one embodiment the method includes receiving a resource identifier and a priority associated with the resource identifier and recording the resource identifier and the priority in the register.

Figure 5:
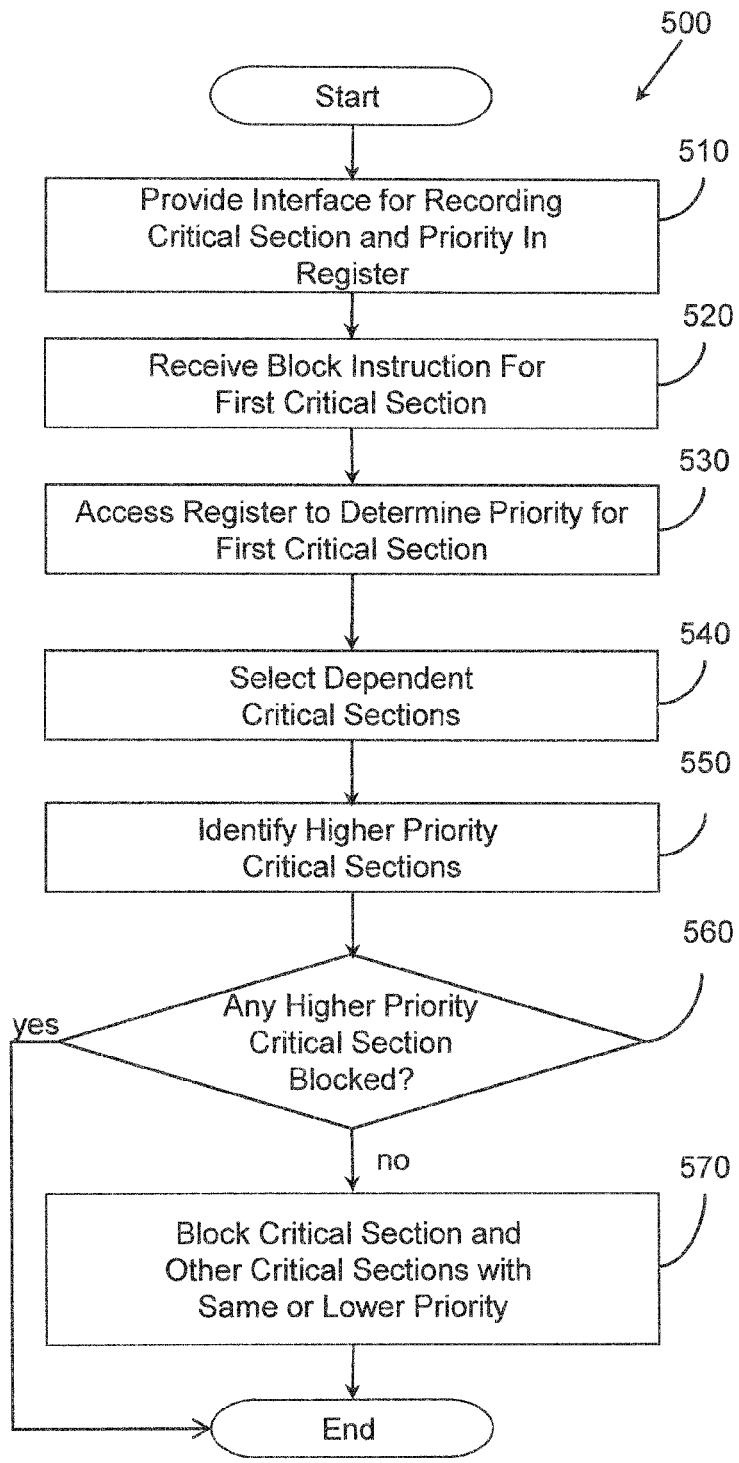
FIG. 5 illustrates one embodiment of a method associated with managing access to critical sections in a multithread processor.

FIG. 5 illustrates one embodiment of a method 500 associated with managed task blocking. The method includes, at 510, providing an interface for recording critical sections and priorities for the critical sections in a register. At 520, the method includes receiving a block instruction from a first thread for a first critical section. At 530, the method includes accessing the register to determine a priority associated with the first critical section. The method includes, at 540, selecting one or more dependent critical sections having the same or lower priority than the first critical section. At 550, the method includes identifying critical sections having a higher priority than the first critical sections. At 560, the method includes determining if any higher priority critical section is blocked. At 570, the method includes blocking access by other threads to the first critical section and the dependent critical sections when no higher priority critical section is blocked. The method may include, when any higher priority critical section is blocked, delaying the blocking of access to the first critical section and the dependent critical sections until no higher priority critical section is blocked.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes a computer or electrical hardware component(s), firmware, a non-transitory computer readable medium that stores instructions, and/or combinations of these components configured to perform a function(s) or an action(s), and/or to cause a function or action from another logic, method, and/or system. Logic may include a microprocessor controlled by an algorithm to perform one or more of the disclosed functions/methods, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic component. Similarly, where a single logic component is described, it may be possible to distribute that single logic component between multiple physical logic components. In some embodiments, one or more of the components and functions described herein are implemented using one or more of the logic components.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, such examples are not intended to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this disclosure is intended to embrace alterations, modifications, and variations that fall within the scope of the appended claims.

What is claimed is:

1. An apparatus, comprising:
   a register configured to store i) respective resource identifiers that identify respective resources and ii) respective priorities for respective resource identifiers; and
   a managing module logic configured to
      receive a blocking instruction for a first resource having a first resource identifier, wherein the blocking instruction is associated with a first task,
      access the register to determine a priority associated with the first resource identifier,
      select one or more dependent resources based, at least in part on the priority associated with first resource identifier, and
      block the first resource and the dependent resources such that the first task is granted access to the first resource and the dependent resources while other tasks are prevented from accessing the first resource and the dependent resources.

2. The apparatus of claim 1 wherein the managing module logic is further configured to:
   access the register to identify resources with resource identifiers having the same or lower priority with respect to the first resource identifier; and
   select the identified resources as the dependent resources.

3. The apparatus of claim 1, wherein the managing module logic is further configured to:
   access the register to identify higher priority resources having resource identifiers with higher priority with respect to the first resource; and
   block the first resource and the dependent resources in a manner determined, at least in part, on a blocking status of the higher priority resources.

4. The apparatus of claim 3 wherein the managing module logic is further configured to:
   determine if any higher priority resource is blocked; and
   block the first resource and the dependent resources when no higher priority resource is blocked.

5. The apparatus of claim 4, wherein the managing module is further configured to delay blocking of the first resource and the dependent resources until no higher priority resource is blocked.

6. The apparatus of claim 1, wherein:
   the register is configured to store i) respective resource identifiers that identify respective critical sections controlling access to respective resources; and
   the managing module logic comprises
      i) a registration logic configured to:
         provide an interface for receiving the resource identifiers and priorities, and
         store the resource identifiers and priorities in the register, and
      ii) a blocking management logic configured to:
         receive the blocking instruction for the first resource associated with the first task,
         access the register to determine a priority associated with a first critical section identified by the first resource identifier,
         select one or more dependent resources based, at least in part on the priority associated with first resource identifier, and
         block the first resource and the dependent resources by blocking access to critical sections that control access to the first resource and the dependent resources.

7. The apparatus of claim 1, wherein the managing module logic is further configured to:
   receive i) a resource identifier and ii) a priority associated with the resource identifier; and
   store the resource identifier and the priority in the register.

8. A method, comprising:
- receiving a blocking instruction for a first resource, wherein the blocking instruction is associated with a first task;
- determining a priority associated with the first resource;
- selecting one or more dependent resources based, at least in part on the priority associated with first resource; and
- blocking the first resource and the dependent resources such that the first task is granted access to the first resource and the dependent resources while other tasks are prevented from accessing the first resource and the dependent resources.

9. The method of claim 8, further comprising selecting resources having the same or lower priority with respect to the first resource as the dependent resources.

10. The method of claim 9, wherein the blocking comprises blocking access to critical sections that control access to the first resource and the dependent resources.

11. The method of claim 8, wherein the determining comprises accessing a register that stores i) respective resource identifiers that identify respective resources and ii) respective priorities for respective resource identifiers.

12. The method of claim 11, further comprising:
- receiving i) a resource identifier and ii) a priority associated with the resource identifier; and
- recording the resource identifier and the priority in the register.

13. The method of claim 8, further comprising:
- identifying higher priority resources with higher priority than the first resource; and
- blocking the first resource and the dependent resources in a manner determined, at least in part, on a blocking status of the higher priority resources.

14. The method of claim 13, wherein the identifying higher priority resources comprises accessing a register to identify resources with resource identifiers having a higher priority with respect to the first resource identifier.

15. The method of claim 14, further comprising:
- determining if any higher priority resource is blocked; and
- blocking the first resource and the dependent resources when no higher priority resource is blocked.

16. The method of claim 15, further comprising delaying the blocking of the first resource and the dependent resources until no higher priority resource is blocked.

17. A device comprising:
- a processor configured to simultaneously process multiple threads;
- a software configured to execute the multiple threads by accessing one or more resources that are shared among the multiple threads, wherein access to each of the one or more shared resources is controlled by a critical section, such that a shared resource cannot be accessed by a thread when the critical section that controls access to the shared resource is blocked; and
- a managing module logic configured to
  - receive a blocking instruction from a first thread for a first critical section;
  - determine a priority associated with a first critical section,
  - select one or more dependent critical sections having the same or lower priority with respect to the first critical section,
  - identify one or more higher priority critical sections having a higher priority than the first critical section,
  - determine if any higher priority critical sections are blocked, and
  - if no higher priority critical sections are blocked, block access by other threads to the first critical section and the dependent critical sections.

18. The device of claim 17, further comprising a memory configured to store a register of i) respective resource identifiers that identify respective critical sections that control access to respective resources and ii) respective priorities for respective resource identifiers.

19. The device of claim 18, wherein the managing module logic is further configured to:
- provide an interface for receiving the resource identifiers and priorities; and
- store the resource identifiers and the priorities received by the interface in the register.

20. The device of claim 18, wherein the managing module logic is configured to:
- access the register to identify resources having the same or lower priority with respect to the first critical section as the dependent resources;
- access the register to identify higher priority resources having higher priority with respect to the first critical section; and
- when a higher priority resource is blocked, delay blocking of the first resource and the dependent resources until no higher priority resource is blocked.

* * * * *